US010001999B2

(12) United States Patent
Tran et al.

(10) Patent No.: US 10,001,999 B2
(45) Date of Patent: Jun. 19, 2018

(54) SYSTEM AND METHOD FOR CONFIGURING A PLURALITY OF REGISTERS WITH SOFT ERROR DETECTION AND LOW WIRING COMPLEXITY

(71) Applicant: Cavium, Inc., San Jose, CA (US)

(72) Inventors: Anh Tran, Santa Clara, CA (US); Gerald Schmidt, San Jose, CA (US); Harish Krishnamoorthy, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 459 days.

(21) Appl. No.: 14/657,921

(22) Filed: Mar. 13, 2015

(65) Prior Publication Data
US 2016/0266836 A1   Sep. 15, 2016

(51) Int. Cl.
G06F 9/44      (2018.01)
G06F 17/50     (2006.01)
G06F 11/10     (2006.01)

(52) U.S. Cl.
CPC ............ *G06F 9/44* (2013.01); *G06F 11/1004* (2013.01); *G06F 17/5054* (2013.01); *G06F 2217/70* (2013.01)

(58) Field of Classification Search
CPC ........ G06F 9/44; G06F 11/1004; G06F 17/50; G06F 17/5054; G06F 2217/70
See application file for complete search history.

(56) References Cited

U.S. PATENT DOCUMENTS 7,392,446 B1 *  6/2008  Simmons ......... G01R 31/31713
                                               326/16
7,826,563 B2 * 11/2010  An ........................... G06F 7/68
                                               331/16

(Continued)

OTHER PUBLICATIONS

Anonymous, "Clocked RS Flip Flop", Nov. 25, 2014, pp. 1-4, https://web.archive.org/web/20141125193456/http://ecetutorials.com/digital-electronics/clocked-rs-flip-flop/.*

(Continued)

*Primary Examiner* — Christopher D Birkhimer

(57) ABSTRACT

A new approach is proposed which contemplates system and method for configuring a plurality of configurable registers in a programmable digital processing engine of a network device. Under the proposed approach, one or more slave configuration controllers (SCC) are utilized to configure a large number of configurable registers in a programmable engine, wherein each SCC is used to configure a plurality of configurable registers, which are organized in multiple configuration groups. The configurable registers in each configuration group are connected in a looped one-way daisy chain. During its operation, each of the slave configuration controllers is configured to receive instructions from a user via a master configuration controller (MCC), performs read or write operations on the configurable registers of one of the configuration groups as designated by the instructions from the user. Here, each of these configurable registers is equipped with an error-detecting circuit to detect dynamic soft errors; and any detected error is promptly reported back to the user through its SCC and the corresponding MCC so that the user is aware of the error at run-time.

26 Claims, 7 Drawing Sheets

(56) References Cited

U.S. PATENT DOCUMENTS

| | | | | |
|---|---|---|---|---|
| 7,940,212 B2* | 5/2011 | Ammann | G01S 19/29 | 342/357.46 |
| 7,958,429 B2* | 6/2011 | Lin | H03M 13/1111 | 714/758 |
| 7,977,965 B1* | 7/2011 | Fleischer | H03K 3/0375 | 326/12 |
| 8,018,378 B2* | 9/2011 | Sun | G01S 19/24 | 342/357.69 |
| 8,095,829 B1* | 1/2012 | Coon | G06F 11/0715 | 714/2 |
| 8,149,166 B1* | 4/2012 | Buxa | H01Q 3/26 | 342/372 |
| 8,175,137 B2* | 5/2012 | Ammann | G01S 19/30 | 375/150 |
| 8,188,761 B2* | 5/2012 | Fleischer | H03K 3/0375 | 326/12 |
| 8,270,457 B2* | 9/2012 | Sun | G01S 19/24 | 369/124.1 |
| 8,509,362 B2* | 8/2013 | Sun | G01S 19/24 | 375/149 |
| 8,755,472 B2* | 6/2014 | Sun | G01S 19/24 | 375/340 |
| 2009/0013237 A1* | 1/2009 | Lin | H03M 13/1111 | 714/758 |
| 2010/0166046 A1* | 7/2010 | Ammann | G01S 19/30 | 375/150 |
| 2010/0302169 A1* | 12/2010 | Pance | G06F 3/0237 | 345/170 |
| 2011/0090112 A1* | 4/2011 | Sun | G01S 19/24 | 342/357.25 |
| 2011/0221473 A1* | 9/2011 | Fleischer | H03K 3/0375 | 326/93 |
| 2012/0281734 A1* | 11/2012 | Sun | G01S 19/24 | 375/149 |
| 2013/0294549 A1* | 11/2013 | Sun | G01S 19/24 | 375/340 |
| 2014/0225835 A1* | 8/2014 | Pance | G06F 3/0237 | 345/170 |

OTHER PUBLICATIONS

Eric Coates, "5.2 SR Flip-Flops", Nov. 11, 214, pp. 1-4, https://web.archive.org/web/20141111041935/http://www.learnabout-electronics.org/Digital/dig52.php.*

Anonymous, "Sequential Logic Circuits", Feb. 28, 2014, pp. 1-8, https://web.archive.org/web/20140228081523/http://www.electronics-tutorials.ws/sequential/seq_1.html.*

* cited by examiner

SYSTEM AND METHOD FOR CONFIGURING A PLURALITY OF REGISTERS WITH SOFT ERROR DETECTION AND LOW WIRING COMPLEXITY

TECHNICAL FIELD

The present invention relates to architectures for configuring a plurality of registers in a programmable electronic device. More specifically, the present invention relates to designs for reducing wiring congestion in configuration of a plurality of registers with soft error detection.

BACKGROUND

Fixed ASIC designs limit the rate of deployment of new features on electronic devices and the hardware changes to support new features are expensive in term of both cost and time. As a result, designs of programmable electronic devices which allow users to deploy new features by means of software have been becoming increasingly attractive. Consequently, both wireline and wireless network systems are moving forward the software-defined architectures, namely software-defined networks and software-define radios. Each electronic device in these network systems includes one or several programmable engines, wherein each of the programmable engines is equipped with a plurality of configurable memories/registers which are reprogrammable by the users so that the device can adapt to and support new features. All of the configurable registers in the programmable engine are controlled (e.g., read or written) by the users and their contents are used by the functional circuits of the engine. Any change in the contents of those configurable registers will change the features of the engine.

In some designs, the plurality of configurable registers in the programmable engine can be configured with one or more configuration controllers. Specifically, each of the configuration controllers directly connects a plurality of configurable registers, wherein each configurable register has a unique register address that allows the user to write to and read from the targeted configurable register. During its operation, each of the configuration controllers receives a write or read request along with the requested address from the user. Upon receiving the write or read request, the configuration controller identifies the register in its plurality of configurable registers to write to or read from and performs a write to or read operation from that identified configurable register. The configuration controller then reports the results of the write to or read operation back to the user after the operation is done.

Assuming there are N configurable registers controlled by a configuration controller in the programmable engine, wherein each of the configurable registers is n-bit wide in size, then there are 2×N×n connecting wires between this configuration controller and these N configurable registers for both write and read data signals. For large N and n, the number of connecting wires required to configure these configurable registers becomes very large, which creates hard physical wiring congestion at the configuration controller, causing significantly increases in both timing violation and silicon area of the programmable engine utilizing these configurable registers.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures in which like reference characters refer to the same parts throughout the different views. It is noted that, in accordance with the standard practice in the industry, various features are not drawn to scale and emphasis instead being placed upon illustrating embodiments of the present invention. In fact, the dimensions of the various features may be arbitrarily increased or reduced for clarity of discussion. The scope of the present patent application is not limited to the disclosed embodiments, but also encompasses combinations of the disclosed embodiments, as well as modifications to the disclosed embodiments.

DETAILED DESCRIPTION

Figure 1:
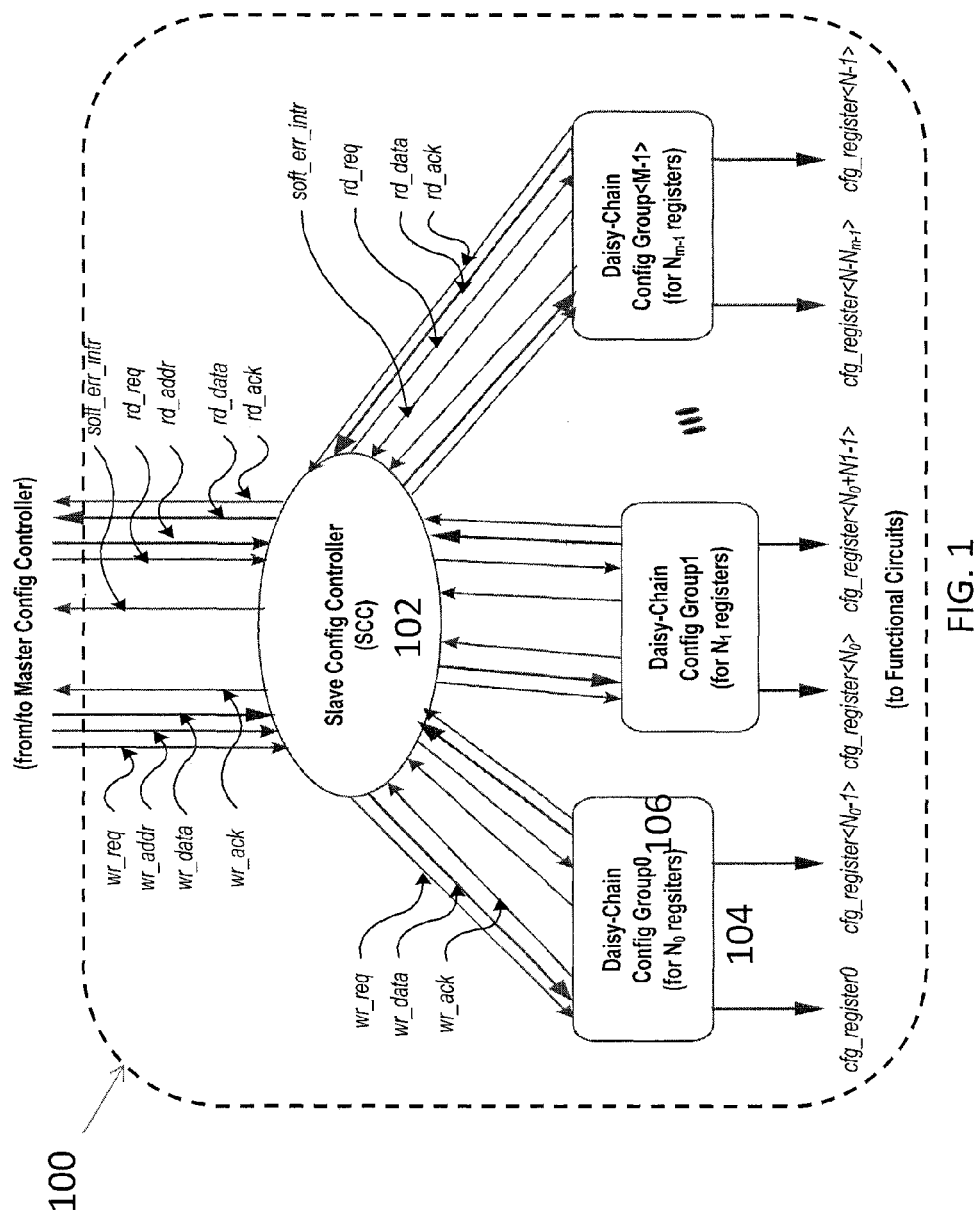
FIG. 1 is an example of a block diagram depicting the proposed system for configuring a plurality of registers with soft-error detection according to an embodiment of the present invention.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed which contemplates system and method for configuring a plurality of configurable registers in a programmable digital processing engine of a network device. Under the proposed approach, one or more slave configuration controllers (SCC) are utilized to configure a large number of configurable registers, wherein each of the SCCs is utilized to configure a plurality of configurable registers, wherein the configurable registers are divided into multiple configuration groups with the configurable registers in each of the configuration groups are connected in a daisy-chained manner. During its operation, each of the slave configuration controllers is configured to receive instructions from a user via a master configuration controller (MCC), perform read or write operations on the daisy-chained configurable registers in one of the configuration groups as designated by the instructions from the user. Here, each of these daisy-chained configurable registers is equipped with an error-detecting circuit to detect dynamic soft errors; and any detected error will be reported back to the user through the slave configuration controller so that the user is aware of the error at run-time.

By adopting a daisy-chain configuration for every group of the configurable registers in the programmable digital processing engine of the network device, the proposed approach is able to significantly reduce the number of wires connecting the slave configuration controller and the configurable registers to $2\times(n+2)$, wherein n is the size (number of bits) per configurable register. As such, the number of wires required under the proposed approach is independent of the number of the configurable registers N configured by a slave configuration controller, and is about N times less than the number of wires needed by other approaches. As a result, the proposed approach alleviates the wiring congestion at the slave configuration controller, which helps not only to avoid timing violation but also to reduce silicon area of the programmable engine utilizing these configurable registers. In addition, by detecting and reporting soft-errors occurring in any configurable registers at run-time, the proposed approach allows the users to be promptly aware of the errors and to reprogram those faulty registers so that the programmable engine may get back to its proper operation.

FIG. 1 is an example of a block diagram depicting the proposed system for configuring a plurality of registers with soft-error detection according to an embodiment of the present invention. Although the diagrams depict components as functionally separate, such depiction is merely for illustrative purposes. It will be apparent that the components portrayed in this figure can be arbitrarily combined or divided into separate software, firmware and/or hardware components.

In the example of FIG. 1, a Slave Configuration Controller (SCC) 102 is utilized to configure a plurality of groups 104s of configurable registers 106 in a programmable engine 100 of a network device, wherein each configuration group 104 has a unique address that allows a user to read data from and/or write data to one of its configurable registers 106 via a read or write request. During its operation, the SCC 102 is configured to receive a write request (wr_req) or a read request (rd_req) along with a request address (wr_addr or rd_addr) from the user through a Master Configuration Controller (MCC, not shown), which is configured to control one or plurality of SCCs 102s in the programmable engine 100.

In some embodiments, the proposed approach supports a hierarchical architecture, wherein there may be one or more SCCs 102s in a programmable engine 100 for controlling a large number of configurable registers 106s, and there may be multiple programmable engines 100s and MCCs in an electronic/network device, wherein all MCCs are controlled by the user through a host CPU, which allows the user to configure and monitor all SCCs 102s and their configurable registers 106s in the device. Here, one MCC in the device can control multiple SCCs in one or more programmable engines 100s, but one SCC 102 is only controlled by one MCC.

Upon receiving the read or write request from its MCC, the SCC 102 is configured to decode the request address received from the user through the MCC to identify which configuration group 104 the configurable registers 106 are in to write data to or read data from. The SCC 102 then performs a read or write operation from or to that identified configuration group 104. For a read request, the SCC 102 reads data from the identified configurable group 104 and returns the read data (rd_data) along with an acknowledgement signal, rd_ack so that the MCC can accept the read data and start issuing another request if any. For a write request, the SC 102 asserts an acknowledgement signal, wr_ack, to the MCC after writing data (wr_data) to the identified configuration group 104 so that the MMC can start issuing another read or write request if any.

In some embodiments, the configurable registers 106 are grouped into one or several groups 104s, namely Daisy-Chain Configuration Groups (DCCG), in which each group 104 includes a plurality of configurable registers 106s having equal or near-equal sizes in term of number of bits. Here, the near-equal sizes among the configurable registers 106 mean the difference between the largest and smallest size of the configurable registers 106 in a group 104 is small enough, e.g., in range of 10% of the largest size, so that dummy bits can be added in some of those configurable registers 106s to make all of the configurable registers 106 in the group 104 have the same size as the largest one in that group 104. Those added dummy bits are not used by the functional circuits in the programmable engine 100.

In some embodiments, all configurable registers 106s are divided into a plurality of (M) Daisy-Chain Configuration Groups (DCCG) 104s, 0, 1, ..., <M−1>, wherein group <i> includes a plurality of configurable registers 106s having the same size of ni bits (after dummy bits are added if necessary). Under such configuration, the number of wires connecting the SCC 102 and all of the configurable registers 106s in all groups 104s can be calculated as:

$$2\times(n0+n1+\ldots+n<M-1>+2\times M)$$

which is independent of the number of the configurable registers 106s in each group 104. Here, the first '2' in the equation is due to two wires dedicated for read and write operations between each configurable register 106 and SCC 102. The second '2' in the equation is for two additional bits for request (wr_req) and acknowledge (wr_ack) signaling per read and write operations. Under the scenario where all of the configurable registers 106s have the same size of n bits (after adding dummy bits), only one group 104 of all of the configurable registers 106s is needed, which further reduces the number of needed wires to only $2\times(n+2)$, wherein n is the size (number of bits) per configurable register 106.

In some embodiments, another bit signal is added in each DCCG 104 to notify the users if there is any soft error happening in any of the configurable registers 106s of that group 104. Soft error at a configurable register 106 happens when one or some flops in that register 106 flip their configured values at the run-time. Those flipped bits may be caused by several run-time environmental condition changes that include but are not limited to temperature changes, cosmic ray and radiation effects, random noises, signal integration problems, etc.

Since soft errors do not occur frequently, adopting equipment for an on-the-fly error-correction circuit per configurable register is expensive and unnecessary. In some embodiments, only error detection circuits are utilized for the configurable registers 106s which are cheaper than the error-correction circuits. If any soft error is detected on a configurable register 106 at run-time, the user will be notified promptly so that the user can reconfigure that faulty configurable register 106 so that the programmable engine 100 can properly operate again.

In some embodiments, for each configurable register 106 that has a soft error detected, the corresponding DCCG 104 is configured to assert its interrupt bit (soft_err_intr) to notify the SCC 102 accordingly. The SCC 102 collects the soft error interrupt bits from all of the configuration groups 104s and stores them in an internal interrupt status register (not shown), and asserts an interrupt signal (err_intr) to notify the MCC, which eventually notifies the user. Once the user gets the soft error interrupt signal from a SCC 102 through a MCC, the user will access the internal interrupt status register of that SCC 102, which maintains information on which DCCG 104 has a soft-error register 106. The user then read all registers in that DCCG 104 for diagnosis and reconfiguration of the those registers 106s.

Figure 2:
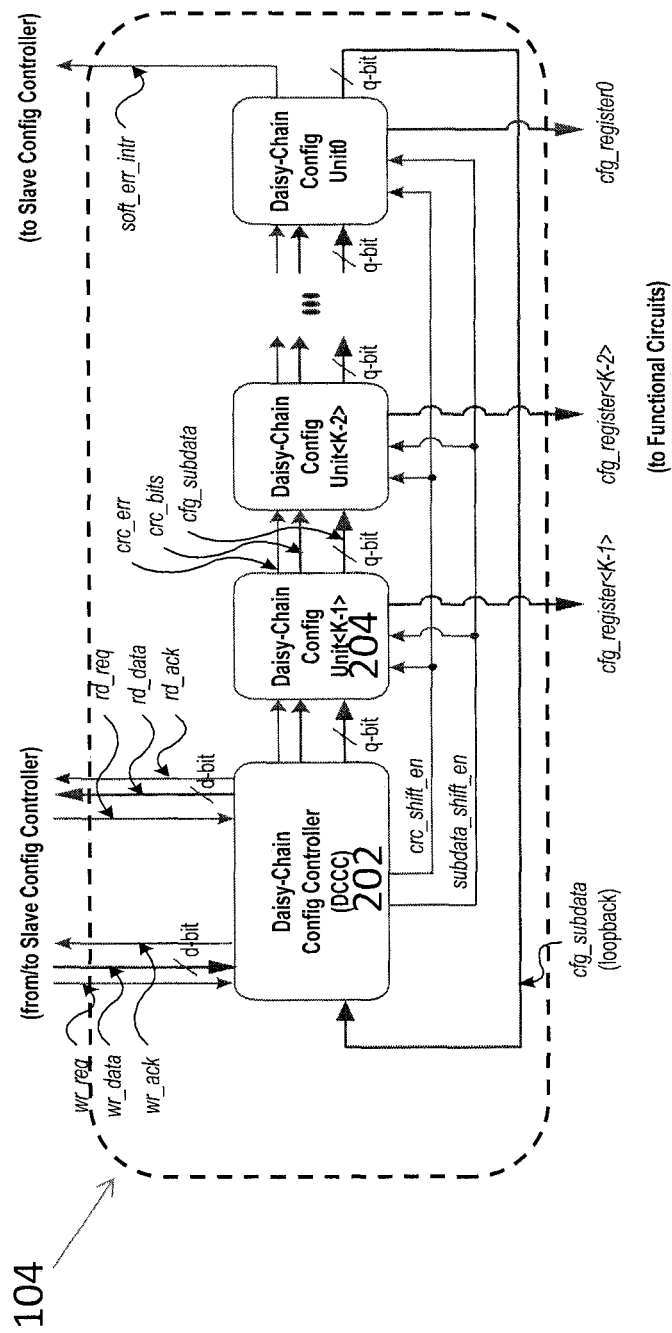
FIG. 2 is an example of a block diagram depicting the configuration of a daisy-chain configuration group according to an embodiment of the present invention.

FIG. 2 is an example of a block diagram depicting the configuration of a DCCG 104 having a plurality of (K) configurable registers 106s. These configurable registers 106s have equal size or near-equal sizes so that a small number of dummy bits are added to some of the configurable registers 106s to make them all have the same size as the largest register in that DCCG 104. As shown in FIG. 2, the DCCG 104 further includes a Daisy-Chain Configuration Controller (DCCC) 202 configured to control the DCCG 104. During its operation, the DCCC 202 is configured to receive the write and/or read requests from the SCC 102 and to perform the process for reading data from or writing new data to the configurable registers 106s in the DCCG 104.

In some embodiments, each of the configurable registers 106 in a DCCG 104 is packed in a Daisy-Chain Configuration Unit (DCCU) 204, wherein the DCCC 202 and all of the DCCUs 204s are connected in a looped one-way daisy chain. The outputs of DCCC 202 are connected to the inputs of DCCU<K−1>, the outputs of DCCU<K−1> are connected to the inputs of DCCU<K−2>, and so on, and the outputs of DCCU1 are connected to the inputs of DCCU0. A loopback path is connected from the outputs of DCCU0 to the DCCC 202 to mainly serve the read operation (which is described in details below). As a result, data are shifted among all of the configurable registers 106 of a DCCG 104 in one direction (e.g., in the right direction as connected in FIG. 2) in the daisy-chain and looped around for each read or write operation.

Upon receiving a write request from the SCC 102 (when the write request signal wr_req is high/On), the DCCC 202 of a DCCG 104 is configured to shift the data to be written (wr_data) to DCCU<K−1> in the daisy chain, wherein the old value in DCCU<i> is shifted to DCCU<i−1> for all i from K−1 to 1 through the daisy chain. After finishing shifting data in the daisy chain for the write request, meaning that the configurable register in DCCU<i> is overwritten by the old value of the configurable register in DCCU<i+1> for all i from K−1 to 0, the DCCC 202 is configured to assert the write acknowledgement signal (wr_ack) in one clock cycle to notify the SCC 102 that it is ready for another write or read request. By following this write operation process, after processing K consecutive write requests from the SCC 102, the DCCC 202 has written the data of the first write request to the configurable register in DCCU0, the data of the second write request to the configurable register in DCCU1, . . . , and the data of the last write request to the configurable register in DCCU<K−1>.

Upon receiving a read request from the SCC 102 (when the read request signal rd_req is high/On), the DCCC 202 of a DCCG 104 is configured to shift old data from DCCU<i> to DCCU<i−1> for all i from K−1 to 1 through the daisy chain and the old data in DCCU0 back to the DCCC 202. After finishing the data shifting, the DCCC 202 is configured to return the data received from DCCU0 to the SCC 102 on the rd_data signal and also assert the read acknowledgement signal rd_ack at the same time to notify the SCC 102 that the read response has been completed so that the SCC 102 can accept the returned data and issue another read or write request if any. By following this read operation process, the values of the K configurable registers 106 in the DCCG 104 are read by the user after K consecutive read requests through the SCC 102.

Note that there are K+1 registers in the daisy-chain, which include the K configurable registers in K DCCUs 204 and one register in the DCCC 202 (for temporarily holding the write data before shifting by a write request, or the read data after shifting by a read request). Consequently, the user needs to issue K+1 read requests in order for the registers in a DCCG 102 having K configurable registers to get back to their original configured values. Here, the first K read requests are issued to read the values in the K configurable registers in DCCU0, DCCU1, . . . , DCCU<K−1>. The last read request is issued to turn the K registers back to their original configured values after they have been shifted. As such, the user may issue the last read request but ignore its returned value.

In some embodiments, the DCCC 202 is configured to compute one or more cyclic redundancy check (CRC) bits for the write data per write request and shifts those CRC bits along with the data through the DCCUs 204 on the daisy-chain, where the CRC is an error-detecting code used to detect errors/accidental changes to the data stored in the configurable registers 106 in the programmable engine 100. At the run-time, each DCCU 204 is configured to compute the CRC bits for its own configurable register 106, and compare those bits with the CRC bits shifted from the DCCC 202. If there is no match between these two CRC bits in any DCCU 204, that DCCU 204 will assert a soft error (crc_err) bit signal, which then propagates through all of the DCCUs 204s in the daisy chain to reach the SCC 102 as the soft-error interrupt (soft_err_intr) signal. Once the SCC 102 notices the soft_err_intr signal (e.g., going high), it will assert the error interrupt signal (e.g., the err_intr signal in FIG. 2), and the MCC will eventually notify the user that soft-errors have happened in one or some of the configurable registers 106s.

In some embodiments, the configured data is shifted between these DCCUs 204s in one or more sub-data sizes of bits, cfg_subdata, per cycle time to further reduce the number of wires connecting between two nearest-neighboring DCCUs 204s (also from DCCC 202 to DCCU<K−1>, and from DCCU0 back to DCCC 202) in a daisy-chain configuration. For a non-limiting example, if the size of each configurable register 106 is d-bit in width where d=p×q, the d-bit data can be shifted in one cycle on d wires or can be shifted in p cycles on q wires of cfg_subdata. In the case where q=1 and p=d, the cfg_subdata wires between the two nearest-neighboring DCCUs 204s can be only one bit where the d-bit configured data is shifted in d cycles with 1-bit sub-data per cycle. As the run-time performance of the programmable engine 100 is much more important than the configuration latency, such configuration option is highly desired in order to minimize the physical wiring congestion in the programmable engine 100 containing a plurality of configurable registers 106s having identical or near-identical sizes.

In some embodiments, the DCCC 202 is configured to control the shifting operations of the CRC bits and data via two shift-enable signals crc_shift_en and subdata_shift_en. In some embodiments, these two shift-enable signals can be combined into one signal if the entire configured data is shifted per cycle rather than in sub-data words (i.e q=d and p=1) and both the CRC bits and configured data can be shifted at the same time.

Figure 3:
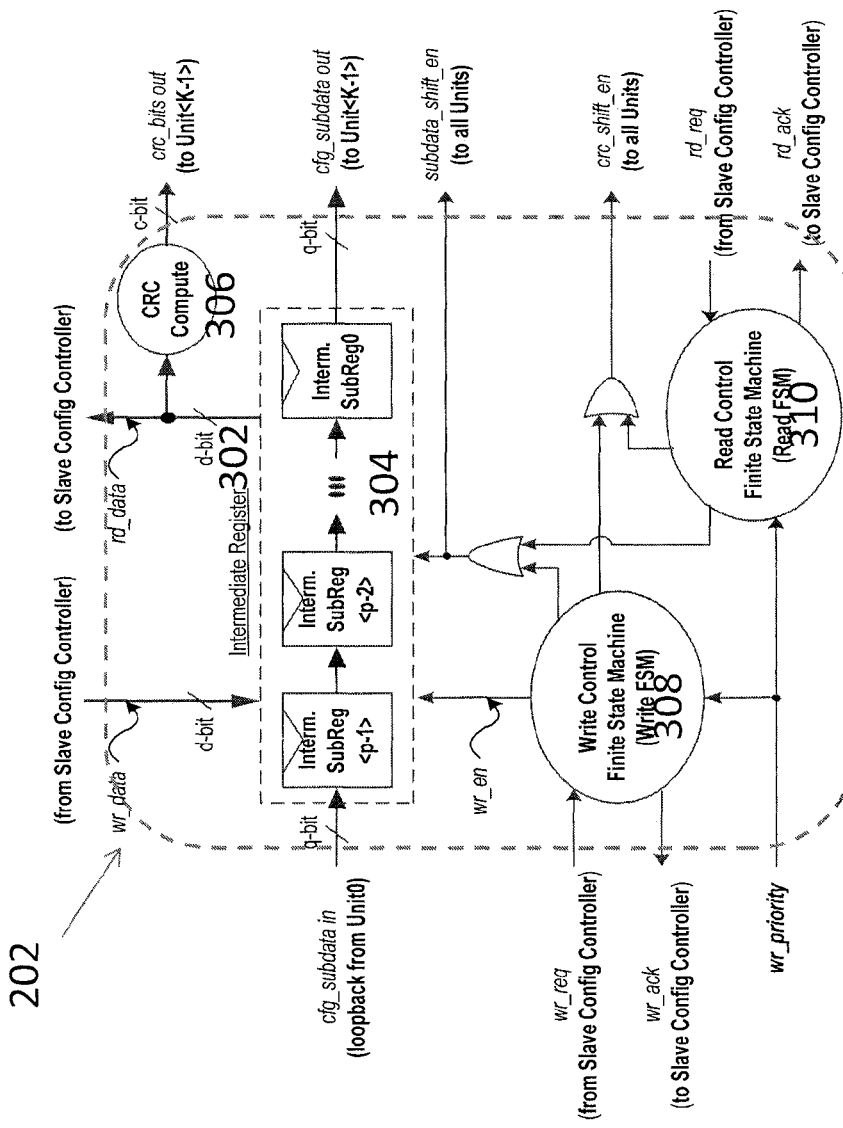
FIG. 3 is an example of a block diagram depicting the configuration of the daisy-chain configuration controller in the daisy-chain configuration group according to an embodiment of the present invention.

FIG. 3 is an example of a block diagram depicting the configuration of the DCCC 202 in a DCCG 104. Upon receiving the write request (i.e., wr_req is high/On) from the SCC 102, the DCCC 202 will turn on the write enable signal (wr_en) to write the received data (wr_data) into its local register, namely intermediate register 302, if the DCCC 202 is idle at the time (e.g., it has already finished a previous write or read operation or it has just been reset). The intermediate register 302 has the same size as the wr_data, e.g., d-bit in width. In some embodiments, the intermediate register 302 is divided into a plurality of (p) intermediate sub-registers 304s, each is q-bit in width where p×q=d. As discussed above, if the entire configured data is to be shifted in one clock cycle, only one sub-register 304 is needed, which is the intermediate register 302 itself (i.e. p=1, and q=d). In the case where only 1-bit sub-data is shifted per clock cycle, d sub-registers 340s are needed wherein each register 304 is 1-bit in width (i.e., p=d, and q=1).

In some embodiments, the p intermediate sub-registers 304 are organized in a chain with the shifted sub-data size being q-bit width as shown in FIG. 3. The sub-data is shifted on the chain each time the subdata_shift_en signal is enabled from intermediate sub-register<i> to intermediate sub-register<i-1> for i from p-1 to 1 per clock cycle, wherein the sub-data in intermediate sub-register0 is shifted to DCCU<K-1>, and sub-data in DCCU0 is shifted to intermediate sub-register<p-1> (following the operation of the daisy-chain depicted in FIG. 2 described above).

After the wr_data has been written into the intermediate register 302, the value of wr_data in the intermediate register 302 is forwarded to a CRC Computation circuit 306, which is configured to compute the CRC bits of the wr_data. These CRC bits will be shifted to DCCUs 204s in the daisy-chain so that the DCCUs 204s may check for any soft errors at the run-time as discussed above. In some embodiments, the CRC circuit 306 can be replaced by a simpler parity circuit, which is much cheaper. A design trade-off consideration is required here because the CRC circuit 306 can be expensive but it is able to detect multiple bits errors per configured data; while the parity circuit is cheaper but detects only one single bit error per configured data.

In some embodiments, the shifting-enable signals crc_shift_en and subdata_shift_en are controlled by two finite state machines in the DCCC 202. The Write Finite State Machine (Write FSM) 308 is configured to receive the write request (wr_req) from the SCC 102, perform the shifting operation to shift the wr_data from the intermediate register 302 to the DCCUs 204s in the DCCG 104, and assert the write acknowledgement signal wr_ack to notify the SCC 102 that the shifting operation for a write request has been completed. The Read Finite State Machine (Read FSM) 310 is configured to receive the read request rd_req from the SCC 102, perform the shift operation to shift data from the DCCUs 204s to the intermediate register 302, return the data in the intermediate register 302 on the rd_data signal wires to the SCC 102, and turns on the read acknowledge signal (rd_ack) at the same time to notify the SCC 102 that the shifting operation for a read request has been completed.

Under the scenario where the SCC 102 issues both a write request and a read request at the same time, only one request is allowed to be performed before another one. To support this, a configurable bit named wr_priority is added to enable the users to give a higher priority to one of these two requests if both are asserted at the same time. If write priority bit wr_priority is enabled, the write request has higher priority than the read request. Otherwise, if the write priority bit wr_priority is disabled, the read request has higher priority than the write request.

Figure 4A:
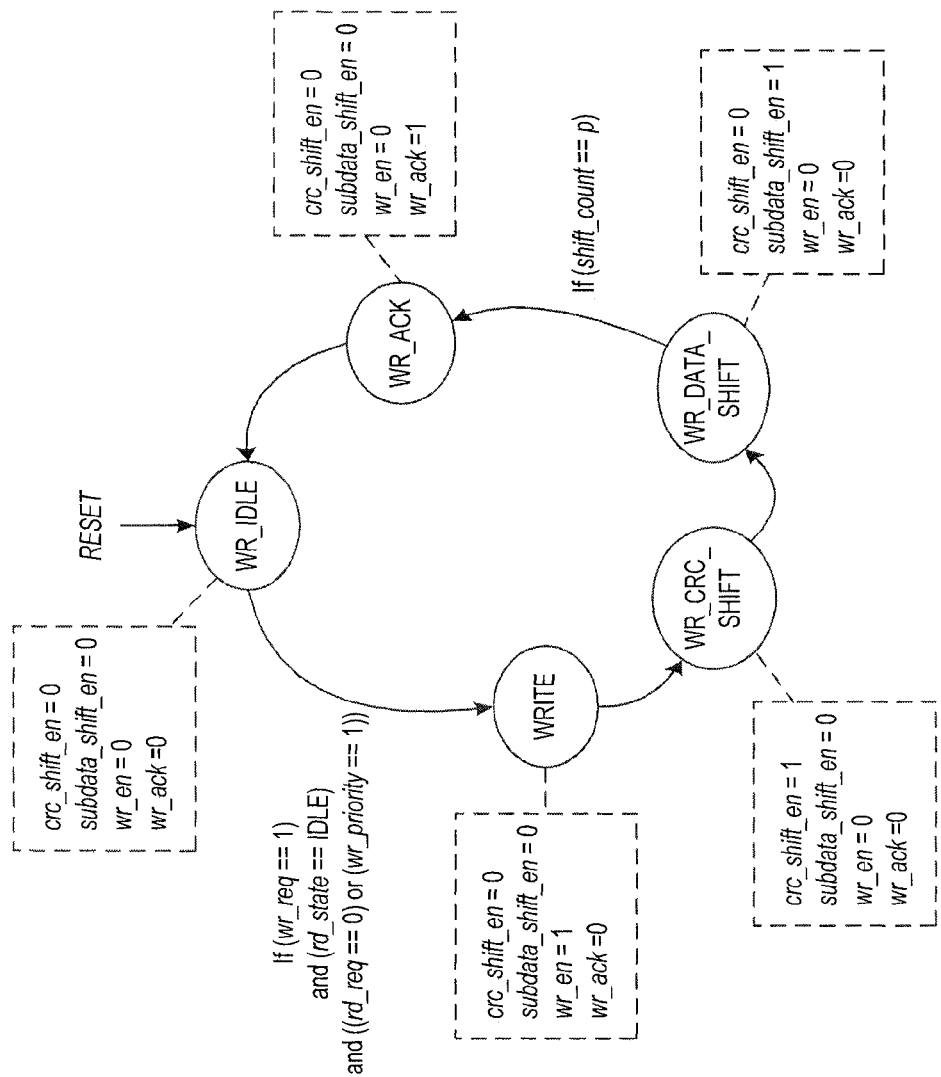
FIG. 4A is an example of a diagram describing the write finite state machine in the daisy-chain configuration controller according to an embodiment of the present invention.

FIG. 4A is an example of a diagram describing the operation of the Write FSM 308 in the in the DCCC 202. To process the write request from the SCC 102, the DCCC 202 is configured to sequentially switch through five write state (wr_state), namely WR_IDLE, WRITE, WR_CRC_SHIFT, WR_DATA_SHIFT and WR_ACK:

Upon the engine 100 gets reset, the wr_state of the DCCC 202 is at the WR_IDLE state where all signals crc_shift_en, subdata_shift_en, wr_en and wr_ack are cleared and reset.

When the DCCC 202 receives the write request (i.e., wr_req is high) from the SCC 102, wr_state switches to the WRITE state if the DCCC 202 is not busy in a read operation (i.e. read state is idle) and if rd_req is low or rd_req is high but wr_priority is high. In this state, the write enable signal wr_en is asserted to allow writing the wr_data into the intermediate register 302. The CRC bits of the data in the intermediate register 302 are also calculated by the CRC computation circuit 306.

After the wr_data is written to the intermediate register 302 and the CRC bits are computed, the wr_state switches to the WR_CRC_SHIFT state in which the crc_shift_en is asserted so that the CRC bits are shifted to DCCU<K-1> (while for every DCCUs on the daisy chain, its CRC bits are shifted to its next DCCU at the same time).

After the CRC bits have been shifted, the wr_state switches to the WR_DATA_SHIFT state in which the subdata_shift_en is turned on so that the q-bit sub-data in sub-registers 304 of the intermediate register 302 are shifted to the DCCUs 204s in the daisy-chain. The subdata_shift_en is high for p clock cycles so that all sub-data words in the p sub-registers 304 in the intermediate register 302 are shifted to the DCCU<K-1> (for every DCCUs on the daisy chain, its data are shifted to its next DCCU at the same time).

In some embodiments, a counter variable (shift_count) is used to count the number of the shifted sub-data words. If the shift_count is equal to p (meaning that the entire data in the intermediate register 302 has been shifted to DCCU<K-1>), the wr_state switches to the WR_ACK state in which the wr_ack signal is asserted to notify the SCC 102 that the write operation has been completed for one write request. After that, the wr_state switches back to the WR_IDLE state to be ready for another write operation if any.

Figure 4B:
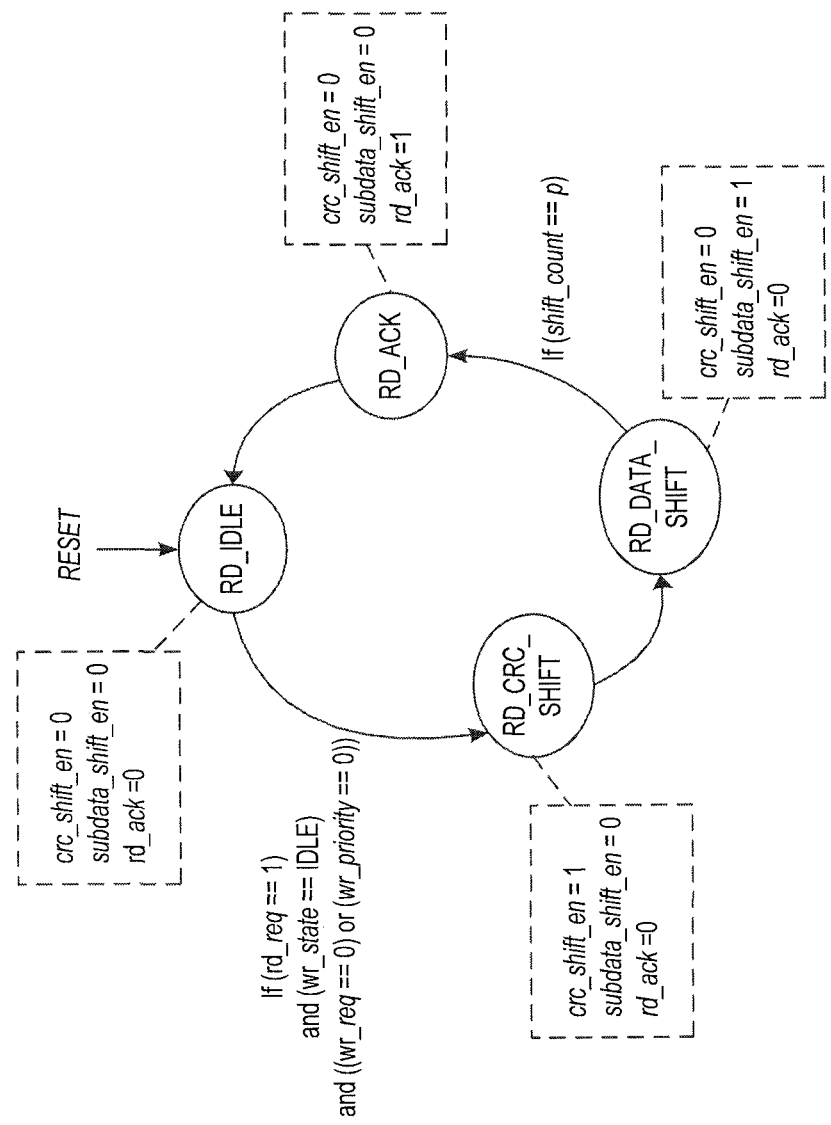
FIG. 4B is an example of a diagram describing the read finite state machine in the daisy-chain configuration controller according to an embodiment of the present invention.

FIG. 4B is an example of a diagram describing the operation of the Read FSM 310 in the DCCC 202. For dealing with a read request from the SCC, the read state (rd_state) of the DCCC sequentially switches through four states, namely RD_IDLE, RD_CRC_SHIFT, RD_DATA_SHIFT and RD_ACK:

Upon the programmable engine 100 gets reset, the rd_state is at the RD_IDLE state where all signals crc_shift_en, subdata_shift_en and rd_ack are cleared and reset.

When the DCCC 202 receives a read request (i.e., rd_req is high) from the SCC 102, the rd_state switches to the CRC_SHIFT state if the DCCC 202 is not busy in a write operation (i.e. write state is idle) and if wr_req is low or wr_req is high but wr_priority is low. In this state, the crc_shift_en is asserted to allow the CRC bits to be shifted from a DCCU 204 to its next DCCU 204 on the daisy-chain.

After the CRC bits has been shifted, the rd_state switches to the RD_DATA_SHIFT state in which the subdata_shift_en is turned on in p clock cycles so that reconfigured data in DCCUs 204s are shifted in the daisy-chain. After the p clock cycles, the configured data in DCCU<i> has been shifted to DCCU<i−1> for every i from K−1 to 1 and the configured data in DCCU0 has been shifted to the intermediate register 302 in the DCCC 202.

At this point, the intermediate register 302 in the DCCC 202 holds the configured data of the configurable register in DCCU0, the rd_state switches to the RD_ACK state in which the data in the intermediate register 302 is returned to the SCC 102 and the rd_ack is asserted to notify the SCC 102 that a configured data has been successfully returned for a read request. After that, the rd_state switches back to the RD_IDLE state to be ready for another read operation if any.

Notice that the WR_CRC_SHIFT and WR_DATA_SHIFT states in the Write FSM 308 can be combined into one state if the configured data is not divided into several sub-data words, meaning the entire configured data can be shifted on the daisy-chain in one clock cycle (p=1, and q=d). Since the CRC bits and configured data are sent on two separate sets of wires, both of them can be shifted in one cycle to reduce the number of the write states, which reduces the write latency. Similarly, the RD_CRC_SHIFT and RD_DATA_SHIFT states in the Read FSM 310 can be combined into one state if the configured data is not divided into sub-data items to reduce the read latency.

Figure 5:
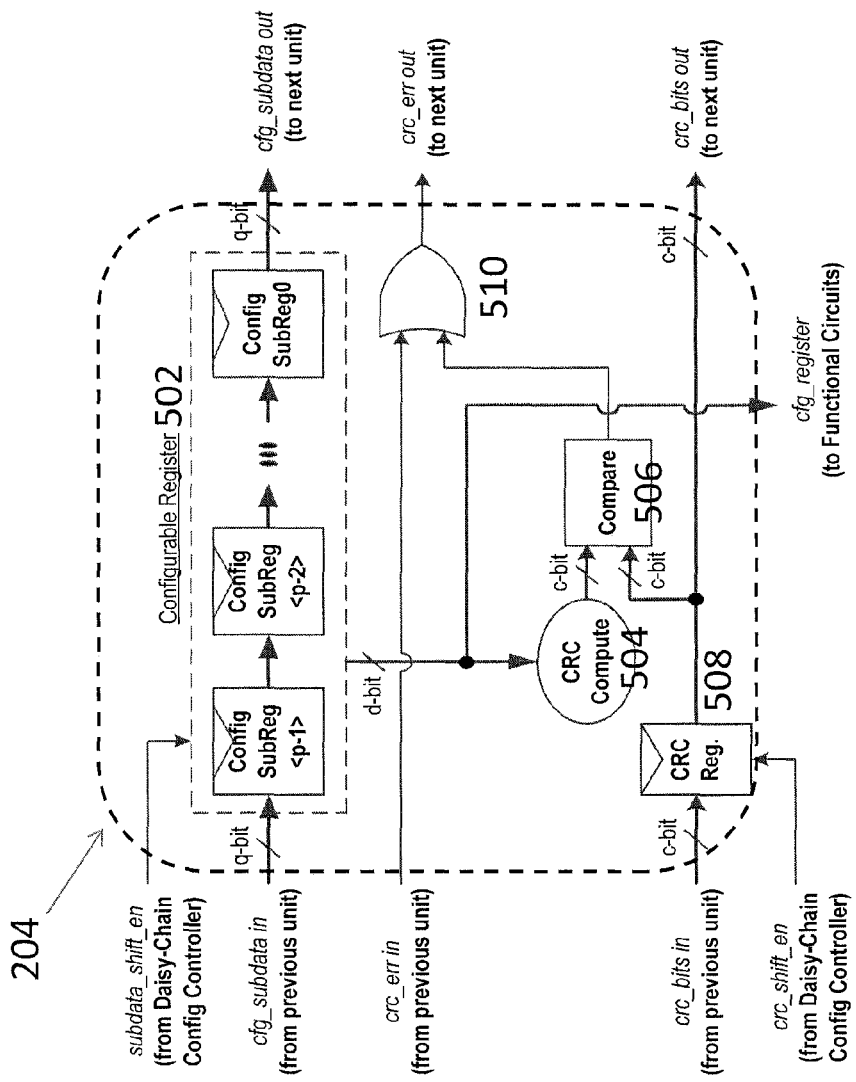
FIG. 5 is an example of a block diagram depicting the configuration of a daisy-chain configuration unit a daisy-chain configuration group according to an embodiment of the present invention.

FIG. 5 is an example of a block diagram depicting the design of a DCCU 204 in a DCCG 104. Each DCCU 204 is configured to receive input data from its previous DCCU 204 and sends output data to its next DCCU 204 in the daisy chain. The input and output data of each DCCU 204 includes the cfg_subdata, crc_err bit, and CRC bits (crc_bits) signals discussed above. In addition, each DCCU 204 is configured to receive two shifting control signals, subdata_shift_en and crc_shift_en signals, from the DCCC 202.

In some embodiments, the d-bit configurable register 502 (106 in FIG. 1) inside the DCCU 204 is organized as a chain of a plurality of (p) multi(q)-bit configurable sub-registers where d=p×q, similar to the intermediate register 302 in the DCCC 202. Selection of p and q needs to be consistent across all DCCUs 204s and the DCCC 202 in a DCCG 104. However, for two different DCCGs 104s where the sizes of their configurable registers 502s are different (i.e. d is different), p and q could be different in these two groups 104s, respectively.

In some embodiments, the DCCU 204 is configured to shift the CRC bits to its next DCCU 204 upon receiving the asserted crc_shift_en signal. Once the subdata_shift_en is asserted, the DCCU 204 is configured to shift the cfg_subdata to sub-register<p−1>, wherein the old data in sub-register<i> is shifted to sub-register<i−1>, for i=p−1 to 1,
and the old data in sub-register0 is shifted to the next DCCU 204. As described above, the Write FSM 308 or the Read FSM 310 in the DCCC 204 is configured to turn on the subdata_shift_en in p cycles for each write or read operation. As a result, the configurable register 502 in DCCU<i> will get the old value of the configurable register in DCCU<i+1>, and its old value is shifted to DCCU<i−1> in the DCCG 104 after p cycles. Referring again to the example of FIG. 3, the configurable register 502 in DCCU<K−1> will get the value of the intermediate register 302 in the DCCC 202 once the subdata_shift_en is enabled in p cycles. Accordingly, the intermediate register 302 in the DCCC 202 will get the old value of the configurable register in DCCU0 after the subdata_shift_en is enabled in p cycles.

In some embodiments, each DCCU 204 is configured to compute the CRC bits for its own configurable register 502 via the CRC computation circuit 504 at run-time. These CRC bits are then compared by CRC comparing unit 506 against the CRC bits shifted from the DCCC 202, which was stored in the CRC register 508. If they match, no error is detected. Otherwise, a soft error is detected and the DCCU 204 turns on the crc_err bit signal. The crc_err bits of all DCCUs 204s in the DCCG 104 are combined together (for a non-limiting example, by an OR gate 510) to be one bit and sent to the SCC 102 on the interrupt signal (soft_err_intr), which informs the users that a soft error has been detected in one or more configurable registers 106s in a DCCG 104. Upon receiving the soft-error interrupt signal, the users would issue one or more read requests to read all configurable registers 106 in that DCCG 104 to figure out which configurable register 106 incurred the error. The user may then reprogram all of the configurable registers 106 in the DCCG 104 to fix the soft errors.

Referring again to the example of FIG. 2, the data of configurable registers 106s in a DCCG 104 are shifted in the daisy-chain of DCCUs 204s for each write or read request from the SCC 102. Consequently, the user needs to issue a plurality of (K) consecutive write requests to write to the K configurable registers in a DCCG 104 to program the configurable registers 106, where the DCCG 104 has K configurable registers. For registers reading, the user needs to issue K+1 consecutive read requests in which the first K read requests are to read out K configurable registers 106s in DCCUs 204s, while the last read is to shift the configurable registers 106s on the daisy chain back to their original configured values.

Figure 6:
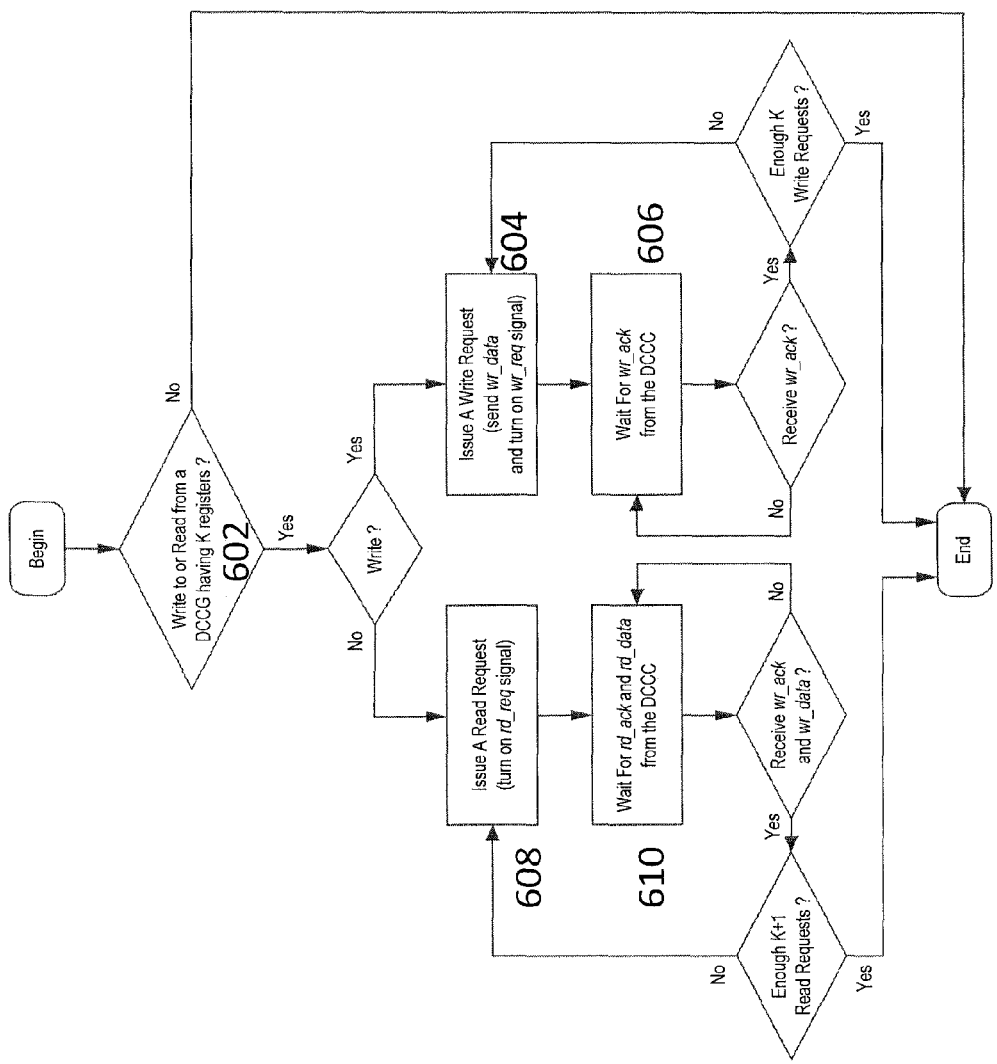
FIG. 6 is an example of a flowchart describing the steps to write data to or read data from the configurable registers in a daisy-chain configuration group according to an embodiment of the present invention.

FIG. 6 is an example of a flowchart 600 describing the steps to write data to or read data from the configurable registers 106 in a DCCG 104. The flowchart 600 serves as a guidance to correctly program a DCCG 104 via a SCC 102 by means of software. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 6, the SCC 102 waits at step 602 until receiving a read or write request from a user to one of its DCCGs 104s having a plurality of configurable registers. If the user issues a write request, the SCC 102 sends the write data (wr_data) to the DCCC 202 of the corresponding DCCG 104 at step 604 and turns on the wr_req signal at the same time. The SCC 102 then waits for wr_ack back from the DCCC 202 at step 606. If the SCC 102 receives the wr_ack asserted by the DCCC 202, meaning a write request has been successfully completed, steps 604 and 606 are repeated wherein the user should issue K consecutive write requests for a write operation on that DCCG 104, which has K configurable registers. After finishing the K consecutive write requests to the DCCG 104, the write operation to that DCCG is complete and the user is allowed to write or read another DCCG 104.

In the example of FIG. 6, if the user issues a read request, the SCC 102 will assert the rd_req signal to the DCCC 202 of the corresponding DCCG 104 at step 608. The SCC then waits for the DCCG 104 to return the rd_data with rd_ack asserted at step 610. If the SCC 102 receives a high rd_ack from the DCCC 202, meaning that a read request has been successfully completed, steps 608 and 610 are repeated wherein the user should issue K+1 consecutive read requests for the read operation on that DCCG 104 having K configurable registers. After finishing the K+1 consecutive read requests to the DCCG 104, the read operation from that DCCG 104 is complete and the user is allowed to write or read another DCCG 104.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is therefore to understand that within the scope of the appended claims, the invention may be practiced otherwise than as specifically described herein. It is intended that the following claims and their equivalents define the scope of the invention.

What is claimed is:

1. A programmable engine in a network device, comprising:
    one or more slave configuration controllers, wherein each of the one or more slave configuration controllers are utilized to configure a plurality of configurable registers organized in one or more daisy-chain configuration groups; and
    said one or more daisy-chain configuration groups connected to one of the slave configuration controllers, wherein each of the one or more daisy-chain configuration groups includes a plurality of configurable registers connected to each other to form a daisy chain in each of the one or more daisy-chain configuration groups, wherein each of the one or more daisy-chain configuration groups has a unique address that allows a user to read data from and/or write data to its configurable registers via read or write requests, wherein each of the daisy-chain configuration groups further comprises a plurality of daisy-chain configuration units each including a configurable register and configured to check soft error for its own configurable register and forward any soft error detected to the slave configuration controller, which in turn is configured to send an interrupt signal to notify the user.

2. The programmable engine of claim 1, wherein each of said slave configuration controllers is configured to
    receive the read or write request along with an address from the user;
    decode the address to identify one of the one or more daisy-chain configuration groups;
    perform a write or read operation to the configurable registers in the identified daisy-chain configuration group.

3. The programmable engine of claim 1, wherein the plurality of configurable registers in each of said one or more daisy-chain configuration groups have equal or near-equal size.

4. The programmable engine of claim 3, wherein one or more dummy bits are added in one or more of the plurality of configurable registers so that the plurality of configurable registers in each of the one or more daisy-chain configuration groups have the same size as the largest configurable register in the daisy-chain configuration group.

5. The programmable engine of claim 4, wherein said one or more dummy bits are added to make all configurable registers in the same daisy-chain configuration group to have the same size while the one or more dummy bits are not used by functional circuits in the programmable engine.

6. The programmable engine of claim 1, wherein said slave configuration controller is configured to decode a read or write address in the read or write request from the user to identify which of the one or more daisy-chain configuration groups connected to it for reading data from or writing data to.

7. The programmable engine of claim 1, wherein each of the one or more daisy-chain configuration groups comprises:
    a daisy-chain configuration controller configured to control all read and write operations to the configurable registers in the daisy-chain configuration group.

8. The programmable engine of claim 7, wherein said daisy-chain configuration controller is configured to
    receive one or more read or write requests from the slave configuration controller;
    perform one or more shift operations to read data from or write data to the configurable registers.

9. The programmable engine of claim 8, wherein the data in the configurable registers are shifted in sub-data sizes that are less than the size of the configurable registers to reduce number of connection wires in the daisy-chain to reduce wiring complexity.

10. The programmable engine of claim 7, wherein said daisy-chain configuration controller and said daisy-chain configuration units are connected in a looped one-way daisy-chain.

11. The programmable engine of claim 7, wherein said daisy-chain configuration controller comprises:
    an intermediate register configured to hold data to be written to the daisy-chain configuration units per write request before shifting the write data to the daisy-chain, and to hold data read from the daisy-chain configuration units per read request before returning the read data to the slave configuration controller;
    a CRC computation circuit configured to generate a plurality of cyclic redundancy check (CRC) bits of the data in the intermediate register;
    a write finite-state machine configured to control the daisy-chain per write request received from the slave configuration controller; and
    a read finite-state machine configured to control the daisy-chain per read request received from the slave configuration controller; and a configurable priority bit configured to give priority to the write request or the read request if these two requests from the salve configuration controller happen at the same time.

12. The programmable engine of claim 11, wherein said daisy-chain configuration controller is configured to shift the CRC bits on the daisy chain in addition to shifting sub-data on the daisy chain via two shift-enable signal bits for shifting the CRC bits and the sub-data, respectively.

13. The programmable engine of claim 12, wherein the two shift-enable bits are combined into one shift-enable bit if the sub-data size is equal to the size of configurable registers so that both the CRC bits and the data are shifted at the same time on the daisy chain.

14. The programmable engine of claim 11, wherein said intermediate register has the same size as each of the configurable registers in the daisy-chain configuration group.

15. The programmable engine of claim 11, wherein said intermediate register is organized into a chain of sub-registers with each sub-register is configured to store a sub-data that is less in size of the configurable register.

16. The programmable engine of claim 15, wherein the chain of sub-registers of the intermediate register is configured to send output to the last configuration unit in the daisy-chain configuration group and to receive input from the first configuration unit in the daisy-chain configuration group.

17. The programmable engine of claim 11, wherein said CRC computation circuit is replaced by a parity computation circuit to reduce cost.

18. The programmable engine of claim 11, wherein said write finite-state machine is configured to receive the write request from the slave configuration controller and assert control bits to control the daisy-chain following a plurality of write states.

19. The programmable engine of claim 11, wherein said read finite-state machine is configured to receive the read request from the slave configuration controller and assert control bits to control the daisy-chain following a plurality of read states.

20. The programmable engine of claim 1, wherein each of said daisy-chain configuration units comprises:

a configurable register programmable by the user, and its content is used by functional circuits of the programmable engine;
a CRC computation circuit configured to generate a plurality of CRC bits of the data in the configurable register;
a CRC register configured to hold the CRC bits shifted from the previous daisy-chain configuration unit in the daisy-chain;
a CRC comparing unit configured to compare the output of the CRC computation circuit against the CRC bits in the CRC register and generate a local soft-error bit;
a circuit configured to combine said local soft-error bit and the soft-error bit received from the previous daisy-chain configuration unit into one bit, and to forward the combined soft-error bit to the next daisy-chain configuration unit in the daisy-chain.

21. The programmable engine of claim 20, wherein said configurable register is organized in a chain of configurable sub-registers with each sub-register is less in size than the configurable register.

22. The programmable engine of claim 21, wherein the chain of configurable sub-registers is configured to receive input from the previous configuration unit and send output to the next configuration unit in the daisy-chain.

23. The programmable engine of claim 20, wherein said CRC comparison turns on its output bit if a soft error is detected.

24. The programmable engine of claim 20, wherein the soft-error bit is combined with a soft-error bit from the previous configuration unit to be one single soft-error output bit indicating a soft-error is detected in a configuration unit in the daisy-chain.

25. The programmable engine of claim 20, wherein said CRC computation circuit is replaced by a parity computation circuit.

26. The programmable engine of claim 20, wherein both the configurable register and CRC register are shifted at the same time if number of data connection wires on the daisy-chain is equal to the size of the configurable register.

\* \* \* \* \*